United States Patent
Link et al.

(10) Patent No.: US 6,658,606 B1
(45) Date of Patent: Dec. 2, 2003

(54) METHOD AND DEVICE FOR CHECKING AN ERROR CONTROL PROCEDURE OF A CIRCUIT

(75) Inventors: Leonard Link, Bad Vilbel (DE); Wolfgang Fey, Niedernhausen (DE)

(73) Assignee: Continental Teves AG & Co. OHG, Frankfurt (DE)

(*) Notice: Subject to any disclaimer, the term of this patent is extended or adjusted under 35 U.S.C. 154(b) by 0 days.

(21) Appl. No.: 09/530,254

(22) PCT Filed: Oct. 27, 1998

(86) PCT No.: PCT/EP98/06802

§ 371 (c)(1),
(2), (4) Date: Aug. 16, 2000

(87) PCT Pub. No.: WO99/22298

PCT Pub. Date: May 6, 1999

(30) Foreign Application Priority Data

Oct. 29, 1997 (DE) ............................................. 197 47 721
Jan. 31, 1998 (DE) ............................................. 198 03 824

(51) Int. Cl.⁷ ............................................. G06F 11/00
(52) U.S. Cl. ............................................. 714/703
(58) Field of Search ............................... 714/703, 815, 714/55

(56) References Cited

U.S. PATENT DOCUMENTS 5,305,325 A * 4/1994 Roos
5,522,422 A * 6/1996 Beck
6,173,422 B1 * 1/2001 Kimura et al. ................. 714/57
6,486,860 B1 * 11/2002 Eschbach ..................... 345/82

FOREIGN PATENT DOCUMENTS

| DE | 36 39 065 | 5/1988 |
| DE | 37 28 561 | 3/1989 |
| DE | 41 37 124 | 5/1993 |
| DE | 43 26 919 | 2/1995 |
| DE | 44 36 372 | 4/1996 |
| DE | 195 06 288 | 8/1996 |

OTHER PUBLICATIONS

Charpentier: "Le Chien de Garde Applique au Microprocesseur", Electronique, vol. 24, p. 53–59 (1993) (No English Translation).
English Translation of the International Preliminary Examiner Report for Application PCT/EP98/06802.
"A Process for Automatically Controlling the Execution of a Sequence of Orders in a Microprocessor", Journal Electronique, Issue No. 224, Jan. 1993, pp. 53–59 No English Translation.
"Le Chien De Garde Applique Au Microprocesseur", Journal Electronique, Jan. 1993, No. 24, Paris, France, pp. 53–59 No English Translation.

* cited by examiner

Primary Examiner—Phung M. Chung
(74) Attorney, Agent, or Firm—Rader, Fishman & Grauer PLLC

(57) ABSTRACT

A method for checking an error control unit in a circuit, wherein the error control unit generates an error signal, when operating properly, if the digital circuit is in an error state. The method includes the following steps: invoking the state indicating the error, monitoring the error signal, and generating an alarm signal when the error signal does not appear or appears incorrectly. A device for checking an error control unit of a circuit, wherein the error control unit generates an error signal when it is operating properly if the circuit is in or outputs a state indicating an error, has a device for inducing the state indicating the error, and a device for monitoring the error signal and generating an alarm signal when the error signal does not appear or appears incorrectly after the state indicating the error was induced.

14 Claims, 3 Drawing Sheets

METHOD AND DEVICE FOR CHECKING AN ERROR CONTROL PROCEDURE OF A CIRCUIT

TECHNICAL FIELD

The present invention discloses a method and device for checking an error control unit in a circuit.

BACKGROUND OF THE INVENTION

In many digital circuits it is highly important that their serviceability can be checked reliably. The operational reliability of such digital circuits, for example, must be acknowledged definitely when they are applied in safety-related circuits; for example, in the construction of automobiles. For this reason, digital circuits frequently include error control units that observe the performance of the digital circuits and generate an error signal when a state indicating an error occurs. Thus, for example, it can be determined whether redundant components run synchronously, and an error signal would be generated if the data in the redundant components were not the same. In the same way, signals can be picked up at individual points in the circuit and queried about non-permissible states or similar conditions. The error control also can monitor signals on interconnecting cables, e.g. on a system bus, and generate an error signal when a state indicating an error occurs.

A process for automatically controlling the execution of a sequence of orders in a microprocessor is described in the journal *Electronique,* issue no. 24, January 1993, pp. 53–59. In this process the time period for executing a sequence of orders is specified and compared to a preset reference time. An external circuit WD which receives a pulse for the reset is provided for defining the time period for executing the sequence of orders. If the time needed for carrying out the orders is too long or too short, if the reset pulse is generated not at all, too early or too late, then the executing time will deviate from the reference time and the occurrence of an error can be indicated immediately. In addition, a test routine is described for this process, by means of which the operational reliability of the circuits can be checked. For this purpose, software is applied to suppress reset pulses to the circuit WD, causing the duration of the program run to be extended in a non-permissible way. Then it is checked whether an error can be detected. In order to ensure that this "intentional" error is not interpreted as an actual error from outside, the method provides, on the one hand, for a reset pulse to be emitted again and, on the other hand, for a filtering process to be carried out with the aid of a filtering device, so that an error signal is generated only on the basis of an error that is recognized as a relevant error.

Since errors occur relatively seldom in digital circuits, corresponding error control units become active comparatively seldom. Hence, it cannot be proven definitively whether the error control unit is working properly.

SUMMARY OF THE INVENTION

The object of the present invention is a method and device for checking an error control unit, wherein these have a simple design and can detect different error conditions.

Before individual embodiments of the invention are described on the basis of the drawings, the terminology used in this application will be explained so as to avoid any misunderstandings. The above-mentioned safety-related circuit whose operational reliability is to be checked is referred to as "circuit" or "digital circuit". When it does not work properly, this is referred to as an "error". The circuit is monitored by an "error control (unit)". When an error occurs, the error control unit emits an "error signal". According to the present invention, a "method for checking" or a "device for checking" the proper functioning of the error signal or the error control unit generating the signal is applied. It should be noted that the monitored circuit on the one hand and the error control unit on the other hand do not necessarily have to be set up discretely, i.e. separately; for example, they can be components of a microprocessor and may not be distinguishable physically. The error control unit emits the above-mentioned error signal when a state indicating an error in the circuit occurs, with the error control unit being checked according to the present invention. If the check of the error control unit according to the present invention shows that the error control unit itself is defective (since it does not emit the error signal at all or not correctly), the checking device according to the present invention or the checking method according to the present invention generates an "alarm signal".

DETAILED DESCRIPTION OF THE PREFERRED EMBODIMENTS

Figure 1:
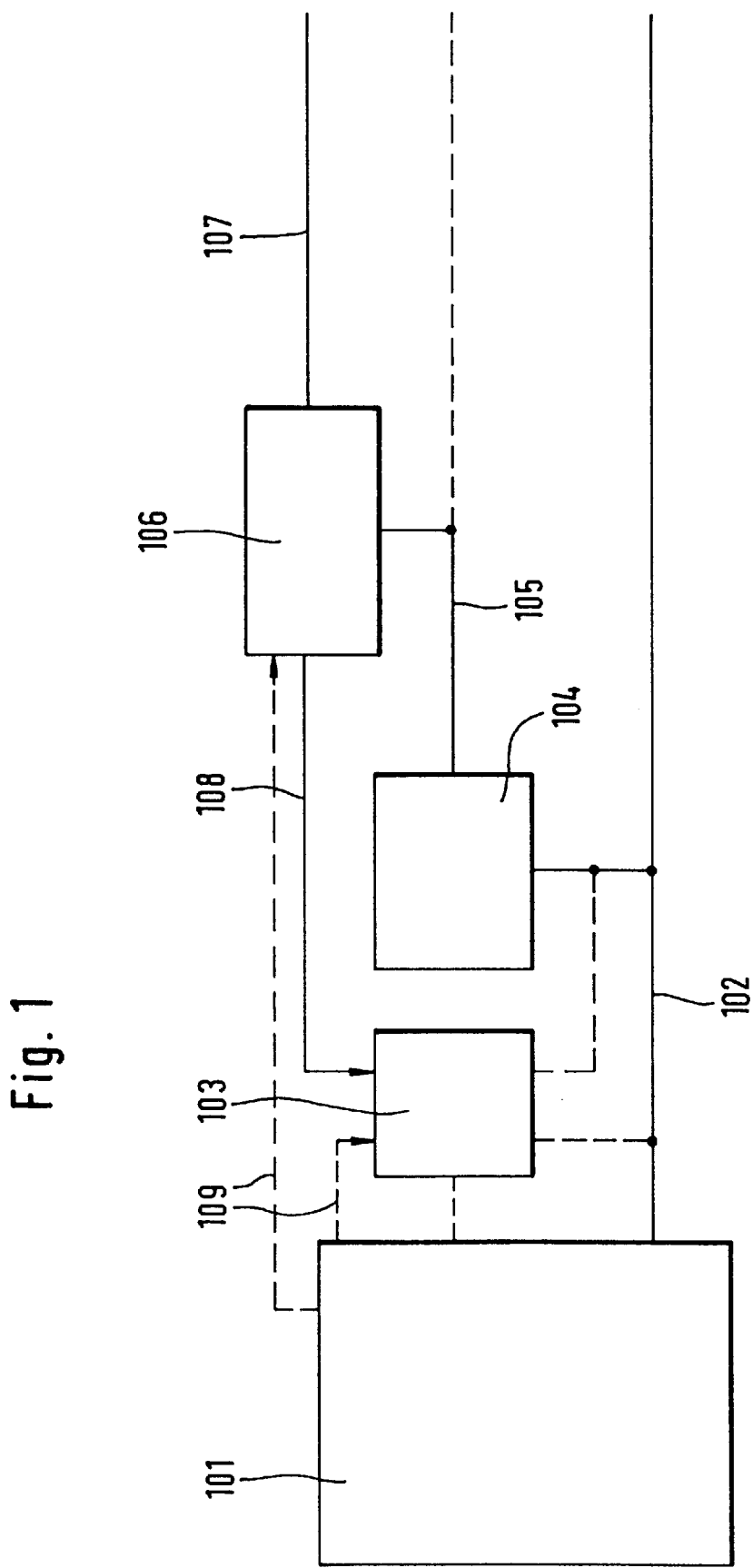
FIG. 1 is a block diagram of the components provided according to the present invention.

FIG. 1 shows a block diagram of individual components. 101 is the circuit whose mode of operating is to be checked. Preferably this is a digital circuit that, for example, can communicate with other components via a signal line. However, 101 can also be an analog circuit. 103 is a device for inducing a state indicating an error. Device 103 can act on circuit 101 or signal line 102 and induce states there that should be detected as errors by the error control unit 104. Device 103 itself can be a digital or analog device. It can provoke faulty operation of circuit 101 or it can more or less address the input of the error control unit 104. Error control unit 104 monitors whether circuit 101 is operating properly by querying output signals and/or internal circuit points and checking for non-permissible states or time characteristics. For example, FIG. 1 can be a system in which 101 is a processor, 102 a bus and 104 an error control unit connected to the bus.

In the same way, assemblies within one single chip are possible, too. Also the error control unit 104 can be an analog device. However, components 101 to 104 preferably are digital components.

When a state indicating an error occurs (irrespective of whether this is real or provoked by device 103), the error control unit 104 will emit an error signal 105 when it is working properly.

In addition a checking device 106 is provided. Together with device 103 it can check the operation of the error control unit. In the process according to the present invention, device 103 indirectly or directly induces a state indicating an error. This state must be detected when the control unit 104 is working correctly, so that control unit 104 must generate an error signal after device 103 induced the state indicating an error. This is checked by checking device 106. If the error signal 105 is generated because the state indicating an error was induced, no alarm signal 107 will be emitted. If, however, the error signal is not output or incorrectly output or not output at the correct time, the checking device 106 generates alarm signal 107.

Preferably the state indicating the error is induced within a gate time, with the gate time being measured in such a way that the correctly generated error signal 105 also must appear during that time.

To coordinate checking device 106 and device 103 for inducing the state indicating the error, signal lines 108 can be provided between them and, for example, to exchange a digital signal indicating the gate time. The components, however, can also be coordinated by means of circuit 101 and signal lines 109.

It should be noted once more that the components mentioned above need not necessarily be discrete. FIG. 1 can be understood as a representation of functions that may be implemented within a circuit, within a chip by means of hardware or partially also software. However, preferably the checking device 106 according to the present invention is a digital circuit, whereas circuit 101, device 103 and control unit 104 can be analog circuits.

A preferred embodiment of checking device 106 that is formed by hardware is described with reference to FIG. 2 which shows four D-flip-flops 201 to 204. Three of these (201 to 203) are interconnected in a ring form in such a way that the Q output of one flip-flop always is connected to the D input of the other flip-flop respectively. The ring-formed interconnection is obtained by means of lines 208.

The D-flip-flops are toggle circuits that take over the digital state applied at the D input, for example, when a leading edge of a digital signal occurs at their clock input CLK. By means of preset inputs PRE and clear inputs CLR, the output Q of a D-flip-flop can be set depending on external signals, either to logical 1 or logical 0 independently of clock input CLK.

In order to be able to carry out the check of the error signal according to the present invention, the flip-flops 201 to 203 interconnected in a ring form are clocked by different clock signals (=inducing them to take over the signal from the D input at the Q output) on the one hand and they are initialized in a certain way. One of the flip-flops (201, hereinafter referred to as the first flip-flop) is clocked at the beginning of the gate time and in particular through a suitable edge of signal 206 indicating the gate time. The following flip-flops (202, 203, hereinafter referred to as the second and third flip-flops) are clocked through a signal 207 according to the error signal 165. The gate time signal 206 can be a digital signal that indicates the time period within the gate time with one state and the time period outside the gate time with the other state. The first flip-flop 201 is activated by the gate time signal 206 in such a way that the flip-flop 201 takes over the input signal at the beginning of the gate time.

Error signal 105, which is to be checked by the checking device can, for example, be a bistable signal that changes its state once for every error (real or provoked error) and, hence, gives rise to a leading or trailing edge. Then an edge indicates an error. The second and third D-flip-flops 202, 203 are activated in such a way that they take over the state at their D input at the Q output whenever an error occurs. When error signal 105 is the bistable signal and the D-flip-flops respond only to leading edges, suitable signal conditioning must ensure that every edge (leading or trailing) of the error signal 105 results in a leading edge for triggering the clock inputs CLK of the second and third D-flip-flops 202, 203. This, for example, can occur by means of a signal conditioning circuit according to FIG. 3. This circuit, whose function will be explained later, receives the actual error signal 105 and generates a clock signal 207 for the D-flip-flops 202, 203.

Figure 2:
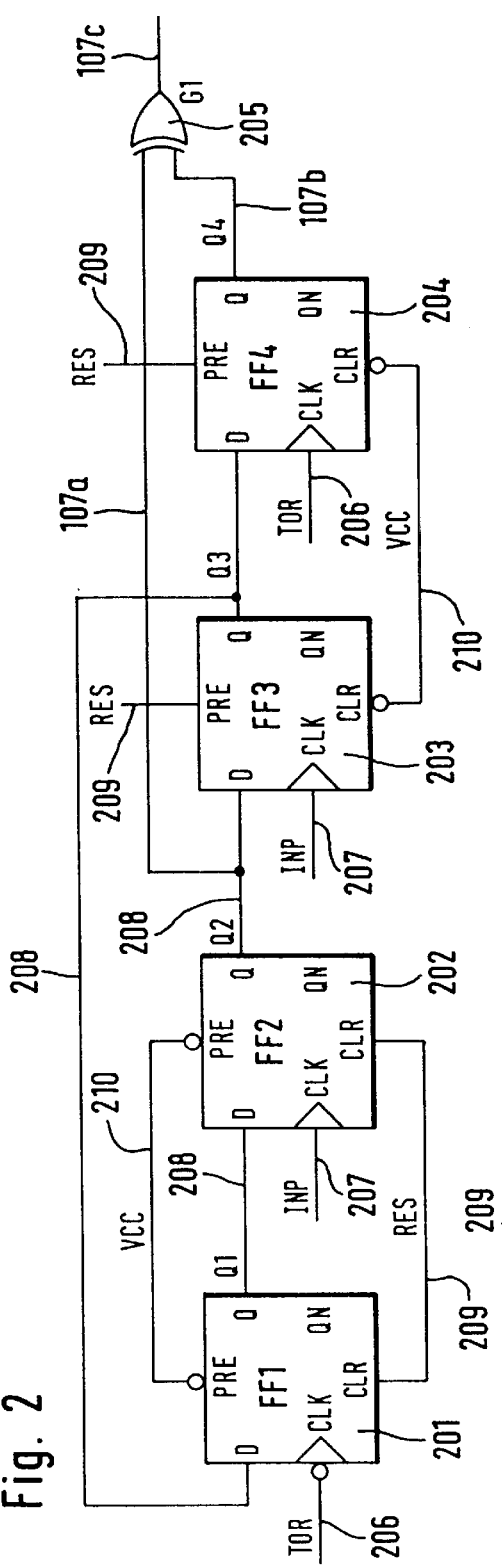
FIG. 2 is an accurate diagram of the checking device according to the present invention.

Moreover, the embodiment according to FIG. 2 exhibits an initialization device 209, 210 that sets the states of the individual flip-flops in an appropriate manner at the beginning. The initialization device 209, 210 consists of signals or connections that act on the preset inputs or clear inputs of the flip-flops. At the beginning the flip-flops are set in such a way that the third flip-flop 203 has the single digital state (0 or 1) at output Q3, whereas the other two flip-flops 201, 202 are set in such a way that they have the corresponding other digital state (1 or 0). The fourth D-flip-flop 4, which will be described later, is set to the same value as the third D-flip-flop 203 by the initialization device 209, 210.

The embodiment according to FIG. 2 is designed in such a way that the signal that is to be checked—error signal 105—clocks the circuit. The circuit is designed in such a way that—as long as error signal 105 is generated in the appropriate way—the state set at the beginning, according to which Q3 has a different state than Q1 and Q2, is maintained because it is not "forgotten" due to the loop-formed structure (D-flip-flops 202–203 and lines 208). The desired alarm signal is picked up at output Q2 of the second flip-flop 202 and/or at output Q3 of the third flip-flop 203.

In the embodiment according to FIG. 2, output Q3 of the third flip-flop 203 is applied to the D input of a fourth flip-flop 204. This fourth flip-flop 204 is clocked at the end of the gate time. Its output is EXOR connected to output Q2 of the second flip-flop. This leads to alarm signal 107c.

The mode of operation of the circuit in different operating states is described below. On the one hand the error control unit 104 can work properly; then an error signal is generated when a state indicating an error occurs. On the other hand incorrect modes of operation may arise when no error signal is emitted or several error signals are emitted.

The latter possibility may take several forms—(i.e. additional error signal following the first error signal can lie within or outside the gate time). In addition, the additional error signal does not necessarily have to be traced back to a malfunction of the error control unit: rather it may indicate an actual (not provoked) error of circuit 101.

The operation of the embodiment according to FIG. 2 is described with reference to FIGS. 4 and 2. The control procedure according to the invention is repeated, e.g. it is executed periodically at intervals $T_P$. The circuit is initialized before the procedure is repeated. For this purpose, the existing flip-flops are set by a suitable pulse RES 401 as described above. Subsequently, for example, a gate time with period $T_P$ is set periodically, and this is indicated by the gate time signal TOR 402. The gate time $T_T$ is shorter than the period $T_P$. The timing of the gate time (logical 0 in signal 402) is selected in such a way that the error signal that is "provoked" by device 103 has to occur during this time. Preferably device 103 induces the state indicating the error at the beginning of the gate time, so that the error signal 105 should occur shortly afterwards. Error signal 105 is shown as signal IN in FIG. 4. As described above it is a bistable signal in this embodiment, which changes once when an error occurs.

Figure 3:
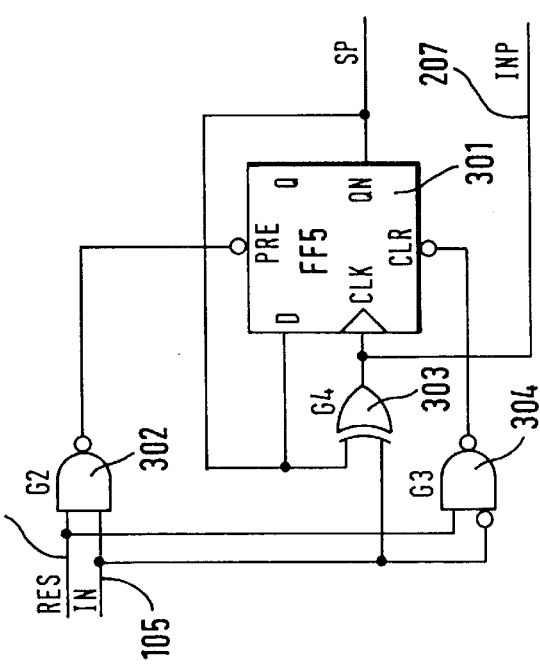
FIG. 3 is a diagram of a pulse-forming circuit for the error signal.

The pulse-forming circuit shown in FIG. 3 transforms the signal IN 105 into signal INP 207. The signal INP 207 has a pulse 414 with a leading and a trailing edge respectively for each edge (leading or trailing) of signal IN 105. Flip-flops that only respond to one of the two edges (leading or trailing) can be triggered with these. Thus, the overall purpose of the pulse-forming circuit is to invoke clocking of the flip-flops for each error. If the error signal already is shaped correspondingly or the flip-flops, for example, respond to leading and trailing edges, the pulse-forming circuit according to FIG. 3 is not needed.

Flip-flop 1 is triggered at the beginning of the gate time. Thus, it takes over the state at its D input. In the example shown, the output then jumps from 0 to 1. A little later the error signal IN 105 and the pulse signal INP 207 with pulse 414 derived therefrom occur, it triggers/clocks flip-flops 202 and 203, so that both of them transmit their inputs to the output. Thus, flip-flop 202 takes over the 1 state at its output, and flip-flop 3 takes over the (previously existing) 0 state at its output. Since flip-flops 202 to 204 only respond to one edge (to the leading edge in the embodiment shown), nothing happens towards the end of the gate time or the end of pulse 414. The duration $T_1$ of pulse 414 preferably is selected in such a way that it is shorter than the gate time. When the error control unit is operating properly the above-described steps make up a single control procedure. The result is that the logical states of outputs Q1 to Q3 have changed. At the same time, the state initialized at the beginning, according to which flip-flop 3 has a different output state than flip-flop 1 and flip-flop 2, is maintained. After another gate time, the conditions are reversed once more, and the state set by the initialization is active once again. Hence, when the error control unit is working properly, the states mentioned alternate and the alarm-free state is indicated by a signal, in which the outputs of the flip-flops, in particular of the second and third flip-flop 202, 203, change regularly. The conditions described are shown in Part A of FIG. 4.

Figure 4:
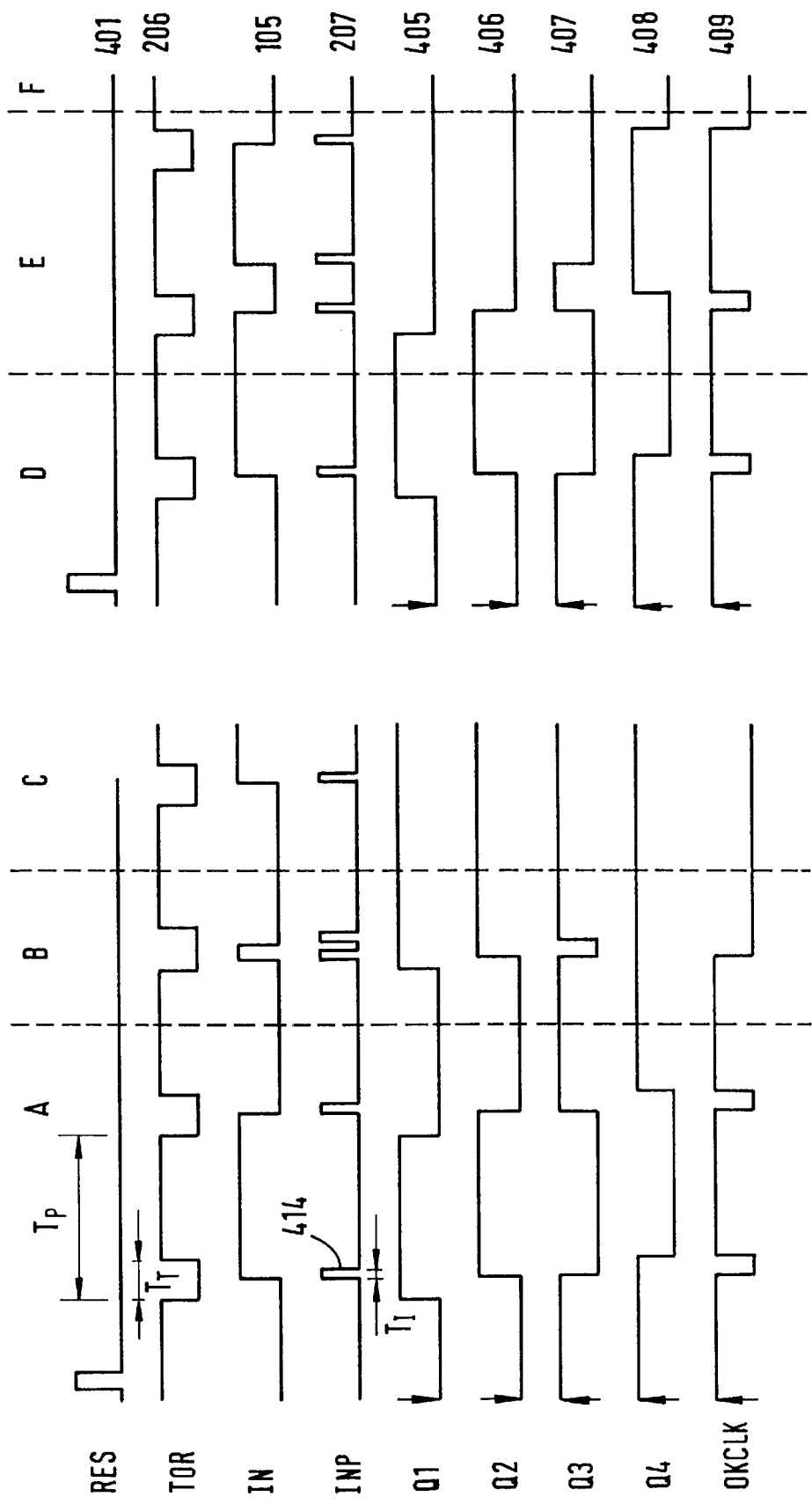
FIG. 4 shows signal curves in the circuits of FIGS. 2 and 3.

Part B in FIG. 4 shows a case when two error signals occur shortly after one another. At first the circuit behaves as described above. When the second error signal occurs (trailing edge in signal IN in FIG. 4, B, or second pulse in signal INP in FIG. 4, B), however, flip-flops 202 and 203 take on their respective input values at their output again. Since, however, the only different state at Q3 was not transmitted to Q1 (because there was no gate time clock), the "different" state is forgotten because Q3 and Q2 both are overwritten with state 1. Thus, all outputs Q1, Q2, and Q3 have the same logical value 1, which cannot be changed by subsequent cycles. Hence, a constant output signal is generated, also after additional cycles.

A case not shown in the figures is when an error signal IN 105 fails to occur. As a result of this the flip-flops 202, 203 are not clocked. Irrespective of what flip-flop 201 does, outputs Q2 and Q3 of flip-flops 202, 203 remain at a constant state.

The fourth flip-flop 204 is provided to determine those cases when an error signal (edge in signal IN 105 or pulse 414 in signal INP 207) occurs after the gate time has expired. After the initialization, Q4 has the value 1 and the EXOR gate 205 has the value 1. If the state of error signal IN 105 changes after the gate time has started, Q2 assumes the value 1 and EXOR gate 205 changes to 0. At the end of the gate time (leading edge of the gate time signal TOR 402) the fourth flip-flop 204 assumes the value 0 at its output and gate 205 changes from 0 to 1. Hence the state is changed. If, however, the error signal IN 105 does not change during the gate time, the output state of gate 205 does not change, so that once again there is a constant signal, indicating an unfavorable result of the checking procedure. If the error signal IN 105 changes several times during the gate time, Q3 is taken over at Q4 at the end of the gate time, so that the output of gate 205 does not change and signal 107c remains constant again.

If, finally, an error signal occurs after the end of the gate time (case E in FIG. 4), Q3 once again takes over the value of Q2, without the only different output value of Q3 having been saved in Q1. Thus, the loop has "forgotten" the different shapes of the output states and once again no state changes at outputs Q1 to Q3 are executed during the subsequent control run (next gate time); consequently, a constant output signal causes an alarm to be emitted.

The embodiment according to FIG. 2 is designed so that it comprises the error signal 105 and alarm signal 107 in such a way that altogether only the alarm signal 107 is emitted. It indicates an alarm both when the error control unit 104 is not working properly and when the error control unit 104 is working properly and determines an error in circuit 101. The latter case corresponds to the cases when several error signals occur. In each case (both error signals within the gate time or one within and one outside the gate time) an alarm signal is generated. In the improbable case that an error signal invoked by a real error occurs at the same time as a provoked error signal it can be assumed that the real error signal will occur again later, so that it can be detected once again later. In this embodiment it is not necessary to filter out as "only provoked" the error message/error signal 105 invoked by the provoked error triggered by device 103. The provoked error does not appear in alarm signal 107.

Consequently, in the embodiment shown in FIG. 2 a signal on line 107c that changes repeatedly indicates fault-less operation, whereas a signal remaining constant over an extended period of time indicates an alarm condition, wherein this alarm condition can be traced back either to an error in circuit 101 or an error in error control unit 104. It is not necessary to distinguish between these two errors because the entire circuit should be checked in any case.

Figure 5:
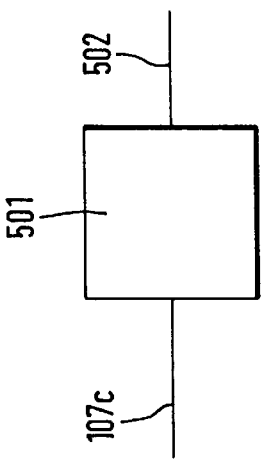
FIG. 5 is a monitoring circuit.

In order to obtain to an alarm signal 107 that can be handled in a more simpler way, signal 107c (output of the EXOR gate 205), for example, can be applied to a signal monitoring circuit 501 (FIG. 5). The circuit is a form of watchdog circuit. It emits one type of state at output 502 for as long as it receives a regularly changing signal at input 107c. If the regular changes fail to occur, it changes to the other state, with this other state then being another alarm signal. In this way, the existence or non-existence of an alarm/error can be determined by simply observing the state of signal 502. The time constants of the watchdog circuit are preferably designed in such a way that in-time state changes are interpreted as "good" and non-occurring and/or early and/or late state changes are interpreted as "bad".

The pulse-forming circuit 301 to 304 in FIG. 3 works as follows: At the beginning of the signal checking procedure, the circuit is reset in the initialization step by means of the reset signal RES 401. Flip-flop 301 and gate 303 are used as edge detectors. Every change at input IN (leading and trailing edge) generates pulse 414 at output INP. The inverted output QN of the flip-flop is set to the same state as the input signal IN 105 by the reset signal RES 401. Due to the EXOR logic operation output INP 207 has the value 0. When the input signal/error signal IN 105 changes its state, a leading edge results at output INP 207, which clocks flip-flop 301. Flip-flop 301 is designed to act as a frequency divider and the inverted output QN changes its value. Thus, EXOR gate 303 once again has two equal input states, and its output INP 207 returns to 0.

What is claimed is:

1. A method for checking an error control unit in a digital circuit, wherein the error control unit generates an error signal, when it is operating properly, if the digital circuit is in a state indicating an error, said method comprising the steps of:

invoking, within a gate time, a state indicating the error, checking, within said gate time, an error signal, and generating an alarm signal when the error signal does not appear or appears incorrectly within said gate time.

2. A device for evaluating an error control unit in a circuit, wherein the error control unit generates an error signal, when it is operating properly, if the circuit is in or outputs a state indicating an error, said device comprising:

a device for inducing a state indicating an error, a device for checking an error signal after a state indicating the error was induced, and a device for generating an alarm signal if the error signal does not appear or appears incorrectly after the state indicating the error was induced, wherein the checking device checks the error signal within a gate time, within which the state indicating the error is induced, and generates the alarm signal if the error signal does not appear or appears incorrectly within the gate time.

3. A device according to claim 2, further including means for generating a digital gate time signal, whose state indicates the gate time.

4. A device according to claim 3, wherein said inducing device includes a plurality of D-flip-flops that do not all share a common clock signal.

5. A device according to claim 4, wherein said inducing device includes an initialization device which sets the outputs of the plurality of D-flip-flops in such a way at the beginning that they do not adopt a common value.

6. A device according to claim 4, wherein said plurality of D-flip-flops includes three D-flip-flops that are interconnected in a ring, with a first being clocked according to the gate time signal and a second and a third according to the error signal.

7. A device according to claim 6, wherein the initialization device sets the first and second D-flip-flop to one logical state and the third D-flip-flop to the other logical state.

8. A device according to claim 7, further including a pulse-forming circuit that receives the error signal and outputs a pulse having a pulse width which is less than the pulse width of the clock signal gate time for the second and third D-flip-flops whenever an edge appears.

9. A device according to claim 6, wherein the alarm signal is a signal that remains constant for at least a predetermined period of time and is picked up at the output of at least one D-flip-flop.

10. A device according to claim 9, wherein the alarm signal is formed from the output signals of each of the D-flip-flops that are clocked according to the error signal.

11. A device according to claim 9, further including a monitoring circuit that receives the alarm signal and outputs a second alarm signal when no state change occurs within a period of time that is longer than the specified period of time.

12. A device according to claim 6, further including a fourth D-flip-flop that is clocked toward the end of the gate time and whose D input receives the output from the third flip-flop and whose output is EXOR-connected with the output of the second D-flip-flop to form the alarm signal.

13. A device according to claim 4, wherein the error signal is a signal whose state changes once when the state indicating the error occurs, with the plurality of D-flip-flops that are clocked according to the error signal being clocked at every edge of the error signal.

14. A device according to claim 2, wherein said inducing device and checking device are digital circuits.

* * * * *